July 11, 1944. P. CLIFTON ET AL 2,353,221
AUTOMOBILE BODY WRECKING PRESS
Filed April 14, 1943 3 Sheets-Sheet 1
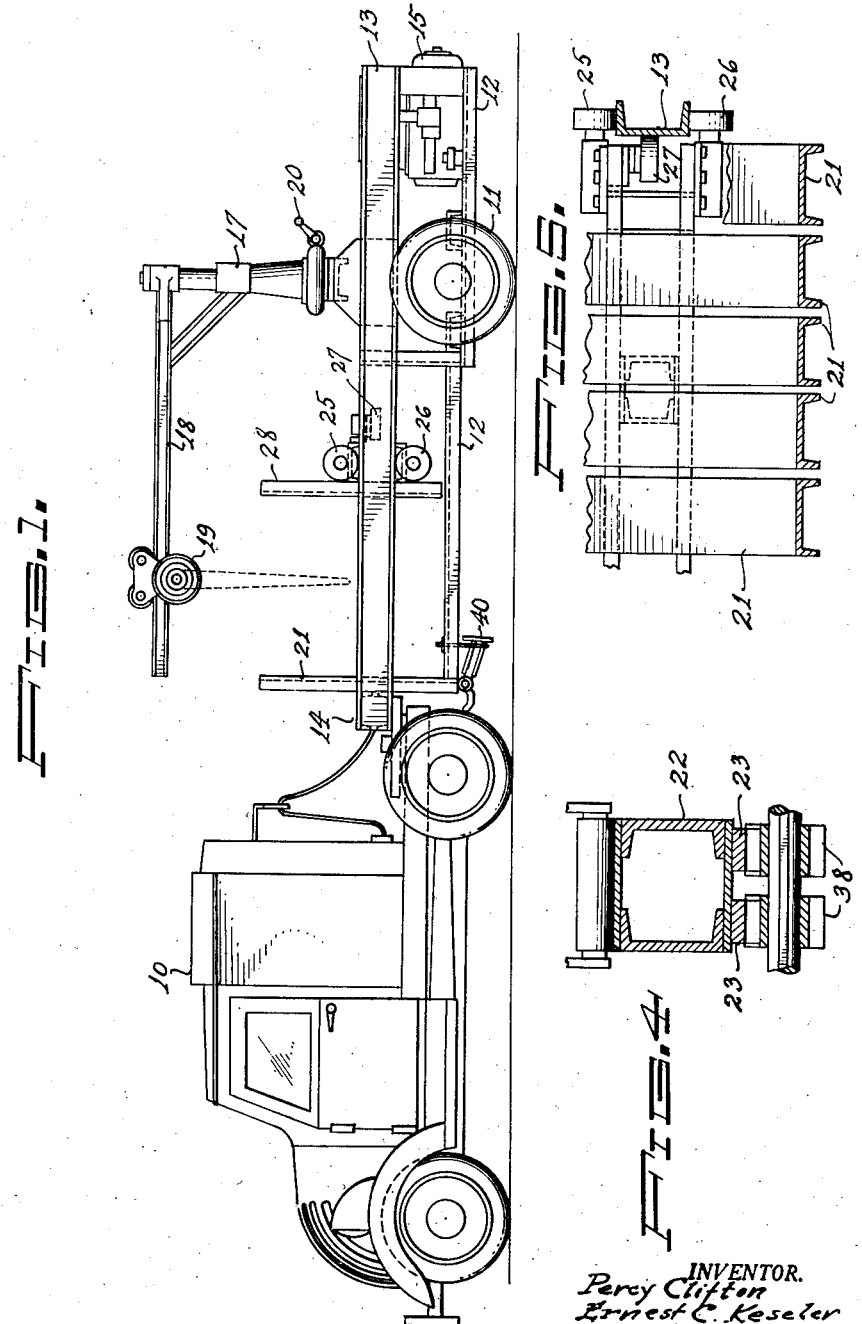
INVENTOR.
Percy Clifton
Ernest C. Keseler
BY
ATTORNEY.

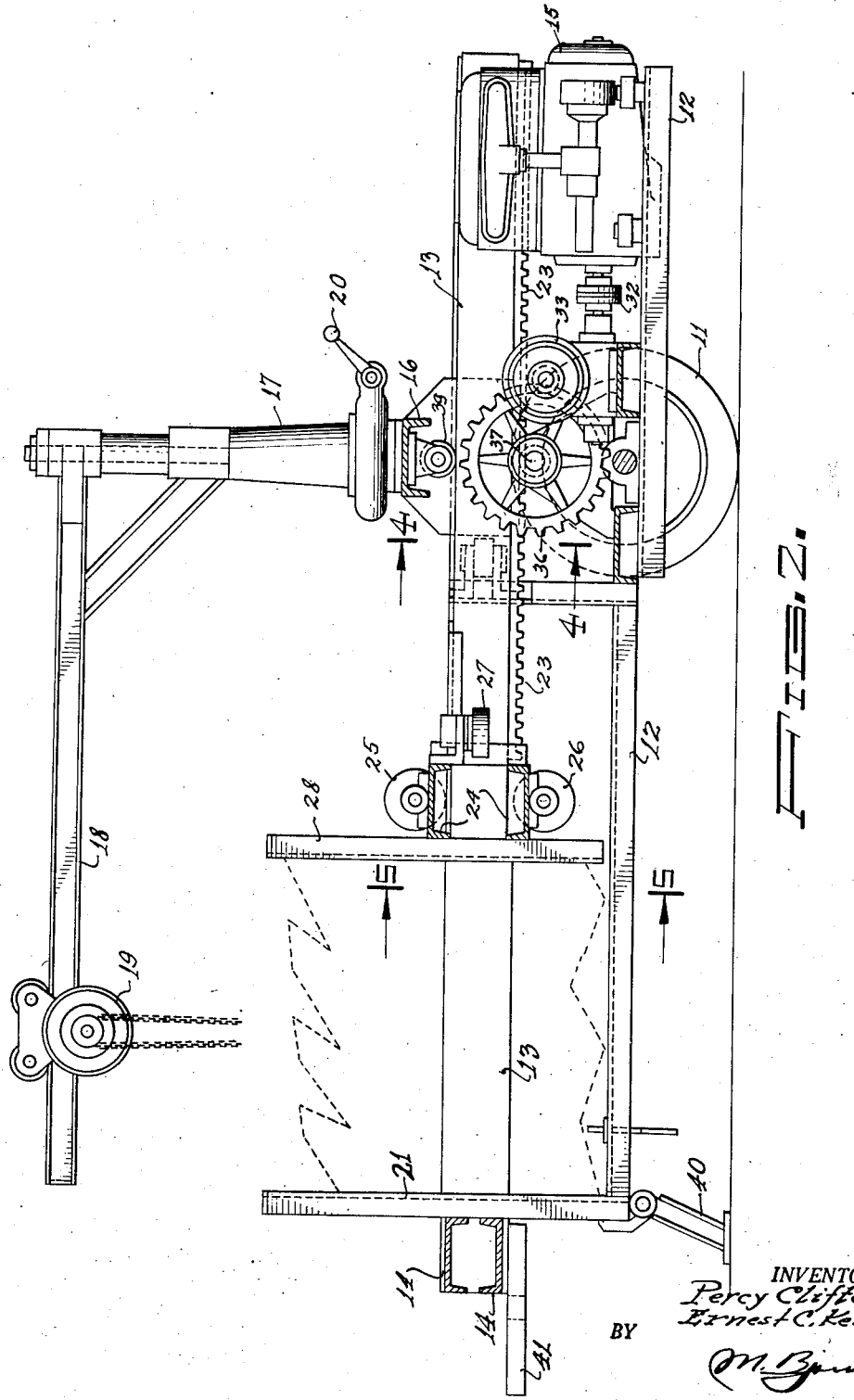

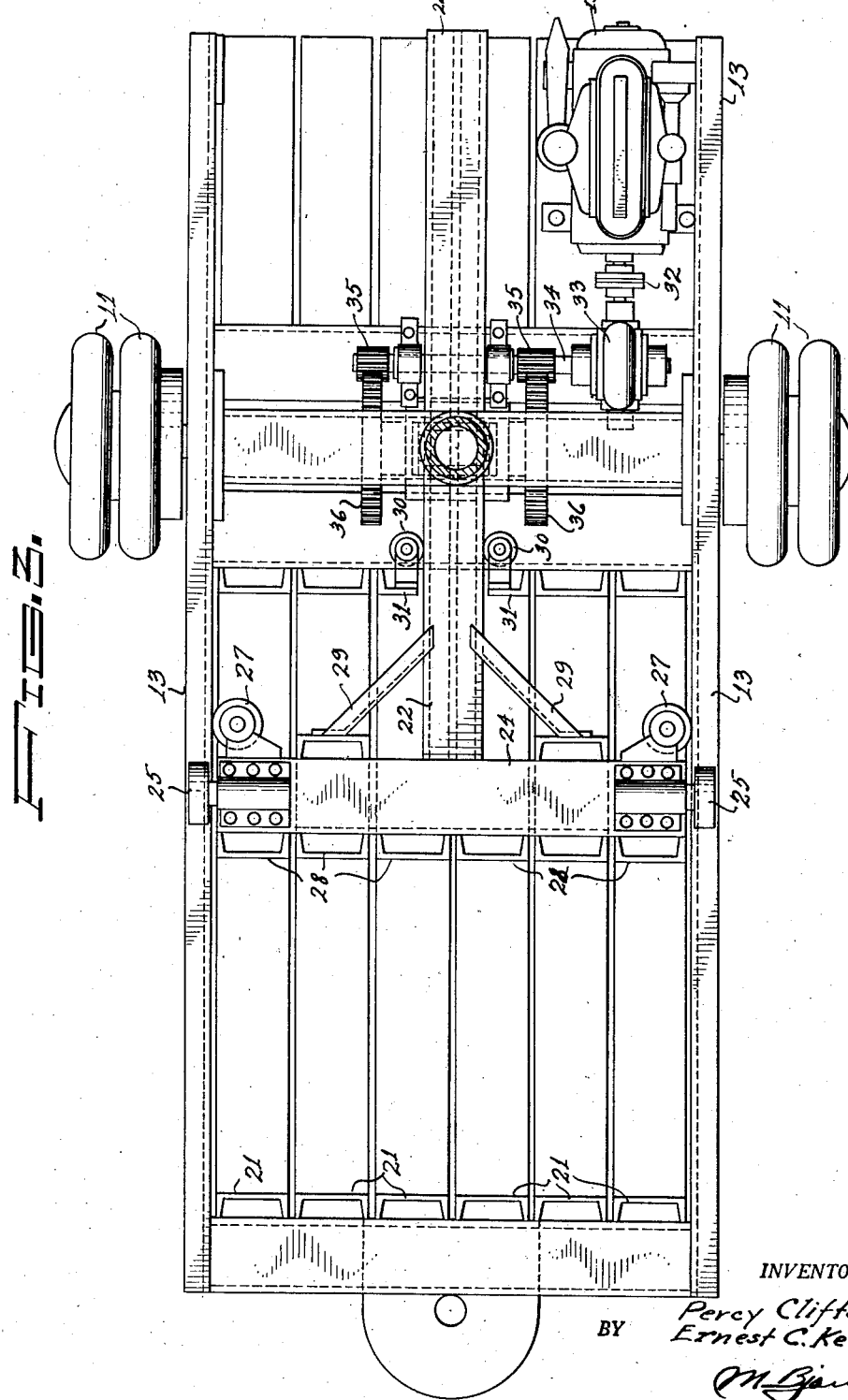

Patented July 11, 1944

2,353,221

UNITED STATES PATENT OFFICE 2,353,221

AUTO BODY WRECKING PRESS

Percy Clifton, Union City, and Ernest Christian Keseler, Carlstad, N. J.

Application April 14, 1943, Serial No. 483,052

2 Claims. (Cl. 153—10)

This invention relates to improvements in automobile body wrecking presses and specifically it pertains to a new portable machine specially built for the salvage of the scrap metals contained in automobile bodies and capable of being transported from place to place, thereby making the transportation of the salvaged metal simpler.

Previous machines of this type have usually been heavy hydraulic presses requiring large compressors and auxiliary equipment and being mounted in one place upon heavy foundations. This necessitated the transportation of all automobile bodies to the press, which was both cumbersome and some times impractical. On account of this situation, the smaller auto salvage operators were unable to utilize such presses and they were obliged to sell their bodies to larger operators who had presses and who transported the bodies to the presses. In this manner the smaller operators obtained only a very nominal price for their automobile bodies because of the heavy transportation cost involved.

The present invention, therefore, brings the proverbial "Mountain" to "Mohammed" by bringing the press to the automobile bodies instead of vice-versa. In this manner, it is possible to salvage the automobile bodies on the spot in the smaller yards and thereby saving large amounts of time and effort, and trucking facilities in the transportation of salvage materials. With our press it is possible for the smaller operator to have his bodies salvaged right in his own yard and he may himself ship the material by truck direct to the consumer, thereby eliminating the unnecessary middle-man and thus making a considerable profit which was formerly denied him. To meet the requirements of such a plan, we have invented a portable press mounted on a heavy trailer chassis and specially designed to make transportation and handling easy.

The object of our invention, therefore, is to provide a portable salvage press for automobile bodies capable of being transported from place to place by means of a tractor or trailer truck.

Another object of our invention is to provide a press which is operable by means of a gasoline driven engine thereby making same independent of the availability of electric power or other power sources.

Still another object of our invention is to provide an automobile body salvage press which can be built from available automobile and truck parts without the necessity of making new castings and special machines which would be prohibitive in war time.

Other objects and advantages of our invention will be apparent during the course of the following description:

In the accompanying drawings, forming a part of this specification and in which like numerals are employed to designate like parts throughout the same, Figure 1 is a side elevation of an automobile body wrecking press embodying our invention, Figure 2 represents an enlarged sectional elevation illustrating details of the press, Figure 3 is a plan view of the press, Figure 4 is a sectional elevation taken along line 4—4 in Figure 2, and, Figure 5 is a sectional elevation taken along line 5—5 in Figure 2.

In the drawings, wherein for the purpose of illustration is shown a preferred embodiment of our invention, the numeral 10 designates the tractor or trailer cab which is utilized for pulling the press from place to place. The press, as illustrated in Figures 1 and 2, comprises a set of truck wheels 11 which due to the weight of the press are of the double wheel type such as used for heavy trucking. Upon the wheels 11 is mounted a chassis comprising a heavy channel iron frame 12, the longitudinal girders 13 with cross members 14. Upon the rear portion of the frame 12 is mounted a gasoline engine 15 which furnishes the motive power for the press. Over the wheels 11, upon the heavy channel iron 16, is mounted a small crane 17 with beam 18 and having a traveling chain hoist 19, as shown in Figures 1 and 2. This crane may be hand operated as indicated in the figures, by means of crank 20, but it may also of course be operated by a suitable connection to the motor 15.

At the forward end of the press, a number of channel iron uprights 21 are fastened against the cross members 14, as shown in Figures 1, 2, 3 and 5. These uprights 21 are also securely welded or fastened to the frame 12 thereby forming a rigid assembly with same. The cross member 16 is securely fastened to the longitudinal frame members 13, thereby forming a rigid support for the crane 17 as well as a means of mounting the ram to the press as will be hereinafter described.

The ram consists of a heavy longitudinal member 22 of a solid steel construction and having racks 23 fastened longitudinally on its under side. At the forward end, the ram 22 carries a cross beam 24 which is slidable between the frame members 13 upon rollers 25. On the bottom side of the cross beam 24 are placed another set of rollers 26 to take up any upward pressure while another set of rollers 27 are mounted in a position to take up side thrust against frame 13, as shown in Figure 3. The cross beam 24 furthermore carries a plurality of uprights 28, similar to the fixed uprights 21 at the forward end of the press. The cross beam 24 is also braced to the ram 22 by means of braces 29. A pair of guiding rollers 30 are mounted on the upright members 31 which form a part of the chassis frame 12 of the press.

The engine 15 is connected through coupling 32 to a worm gear 33 which is preferably constructed from the rear end of a truck. The shaft 34 from the worm gear 33 carries two pinions 35 which are driving a large gear 36, see Figures 2 and 3. Upon the shaft 37, connecting the two gears 36 are mounted two pinions 38, which are engaged with the longitudinal racks 23, see Figure 4.

To take up the thrust created by the force from pinions 38 against the racks 33 there is mounted a roller 39 under cross member 16 transversely to ram 13 and in operable engagement with same. The rear end of the ram 22 is free while the forward end is fastened to the cross beam 24 with rollers 25, 26 and 27 as previously described. The chassis frame 12 is furnished with a support 40 which is adjustable and may be placed in a suitable position to support the forward end of the press when in use. An attachment 41 placed under the cross members 14 permits the attachment of the press to the tractor 10 in the usual manner.

The operation of our invention is as follows:

After an automobile body has been stripped and burned out, it is placed in the press by means of the hoist 19 and is put in a position between the uprights 21 and 23, as indicated by dotted lines in Figure 2. The engine 15 is then started driving the worm gear 33, pinions 35, gears 36 and pinions 38 whereby a forward motion will be given to the ram 22. Due to the large reduction gearing and amount of power available, the force exerted upon the ram 22 is very considerable and has been found sufficient to flatten out the automobile bodies into a thin cake of sheet metal which is easily handled and transported. It is obvious that, if desired, a clutch may be introduced instead of the coupling 32 whereby the engine may be kept running and applied at will, and it is equally possible to use a reversing gear whereby the action of the ram may be reversed.

It is to be understood that the form of our invention, herewith shown and described, is to be taken as a preferred example of the same and that various changes in the shape, size and arrangement of parts may be resorted to, without departing from the spirit of our invention or the scope of the subjoined claims.

Having thus described our invention we claim:

1. An automobile body wrecking press of the character described, comprising a set of truck wheels; a heavy frame chassis mounted on said wheels; a combustion engine mounted on said chassis; a ram slidably mounted, centrally and longitudinally on said frame chassis; a plurality of reduction gears connecting said ram to said combustion engine; a cross member carried by the forward end of said ram; a plurality of rollers mounted on both ends of said cross member, said rollers being in operable engagement with said chassis frame; a plurality of uprights fastened to said cross member, and a plurality of uprights fastened to said chassis frame on its forward end whereby automobile bodies may be placed between said uprights and salvaged substantially as described.

2. An automobile body wrecking press of the character described, comprising a set of truck wheels; a heavy chassis frame mounted on said wheels; an automobile engine mounted on said chassis frame; a heavy ram centrally mounted and slidable longitudinally on said chassis frame, said ram having a rack mounted longitudinally on its bottom side; a clutch and reversible transmission gearing connected to said automobile engine; a plurality of reduction gears connecting said rack to said automobile engine through said clutch and reversible gearing; a cross-member carried by the forward end of said ram; a plurality of rollers mounted on both ends of said cross-member, said cross-members being in operable arrangement with said chassis frame, and a plurality of up-rights fastened to said chassis frame on its forward end whereby automobile bodies may be placed between the said up-rights and salvaged substantially as described.

PERCY CLIFTON.
ERNEST CHRISTIAN KESELER.